Figure 1:
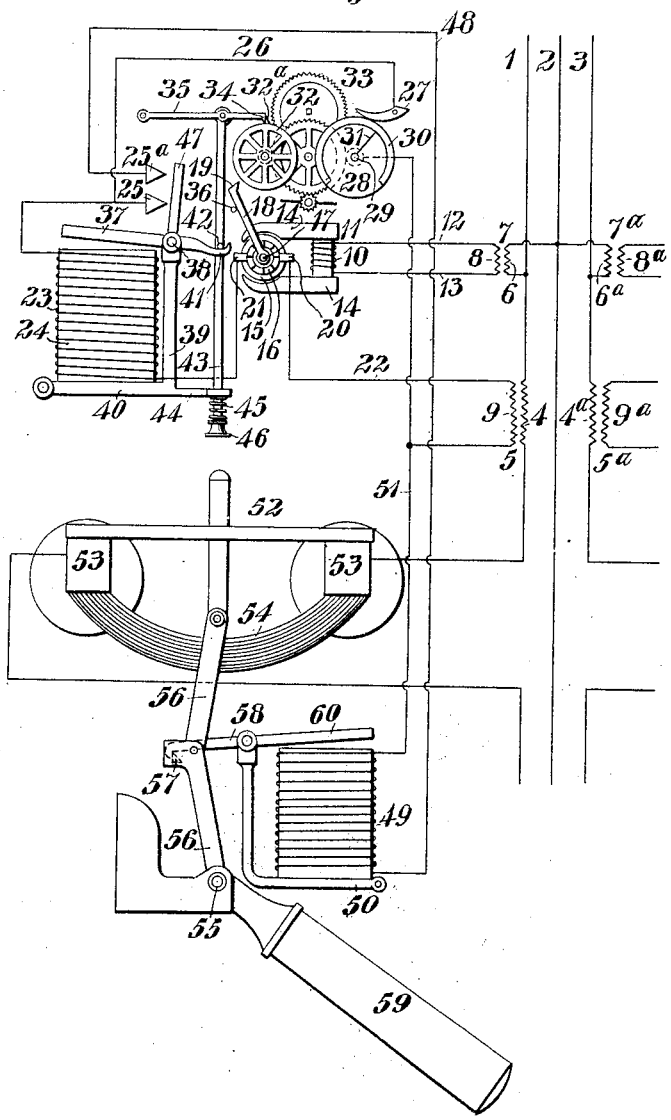

No. 688,359. Patented Dec. 10, 1901.
L. B. STILLWELL.
CIRCUIT BREAKING APPARATUS FOR ELECTRICAL CIRCUITS.
(Application filed June 12, 1900.)
(No Model.) 2 Sheets—Sheet 1.

WITNESSES:
C. L. Belcher
Sumner Leiter

INVENTOR
Lewis B. Stillwell
BY
Wiley E. Carr
ATTORNEY.

No. 688,359. Patented Dec. 10, 1901.
L. B. STILLWELL.
CIRCUIT BREAKING APPARATUS FOR ELECTRICAL CIRCUITS.
(Application filed June 12, 1900.)
(No Model.) 2 Sheets—Sheet 2.
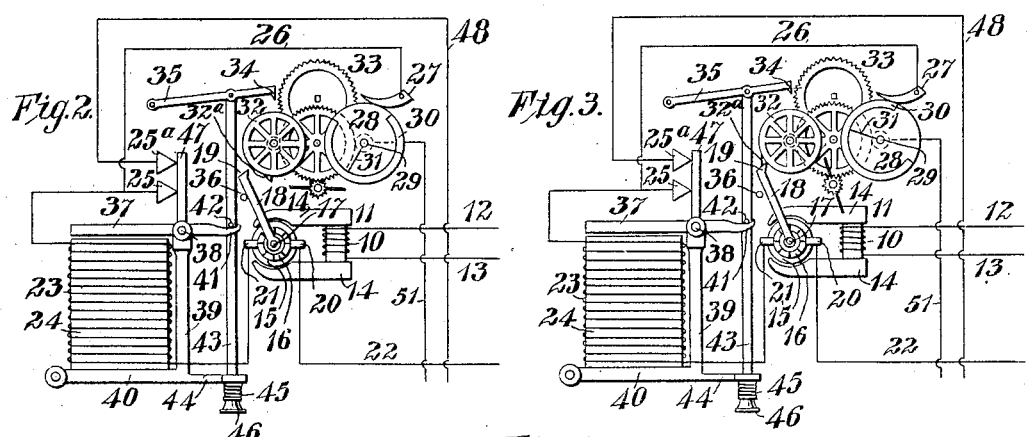
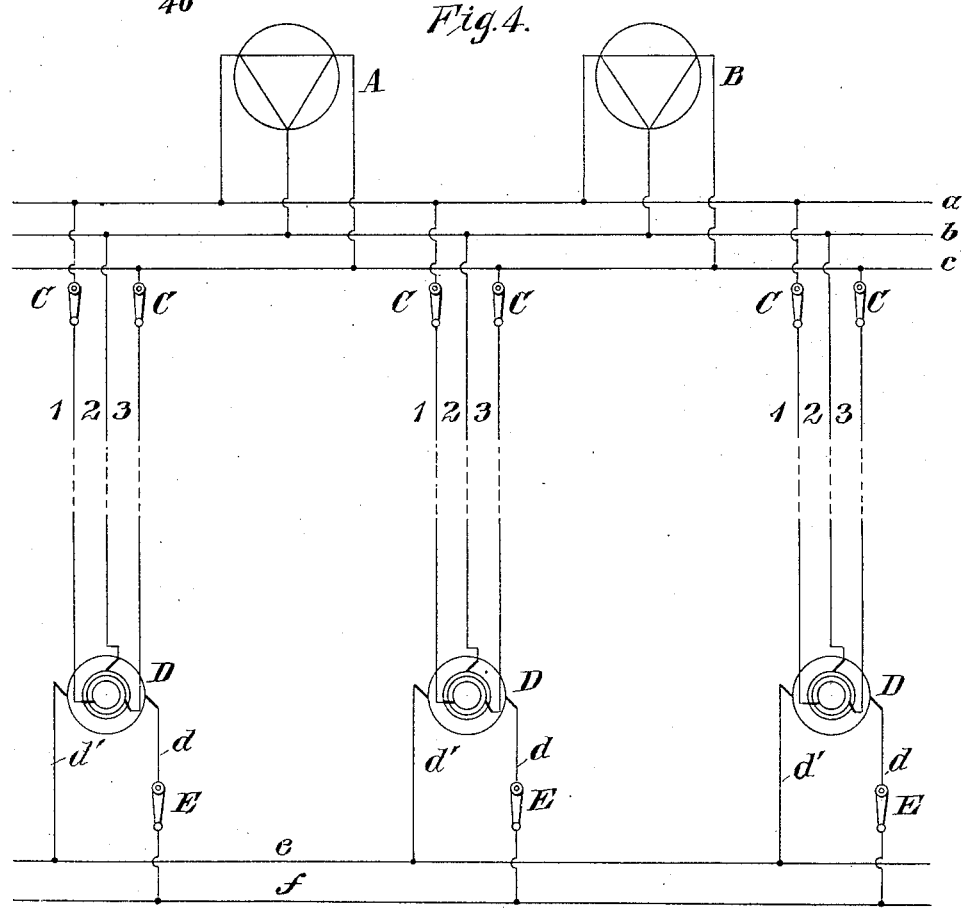

UNITED STATES PATENT OFFICE.

LEWIS B. STILLWELL, OF NIAGARA FALLS, NEW YORK, ASSIGNOR TO WESTINGHOUSE ELECTRIC AND MANUFACTURING COMPANY, A CORPORATION OF PENNSYLVANIA.

CIRCUIT-BREAKING APPARATUS FOR ELECTRICAL CIRCUITS.

SPECIFICATION forming part of Letters Patent No. 688,359, dated December 10, 1901.

Application filed June 12, 1900. Serial No. 20,097. (No model.)

*To all whom it may concern:*

Be it known that I, LEWIS B. STILLWELL, a citizen of the United States, residing at Niagara Falls, in the county of Niagara and State of New York, have invented a new and useful Improvement in Circuit-Breaking Apparatus for Electrical Circuits, of which the following is a specification.

My invention relates to systems of electrical distribution, and particularly to means employed for protecting such systems from injuries resulting from short circuits and overloads.

The object of my invention is to provide a simple and effective means for breaking an electric circuit which is made operative by an excessive current of normal direction in such circuit, but which is not operated by a reverse current of any volume or duration.

With this end in view I have devised the means illustrated in the accompanying drawings, in which—

Figure 1 is a front elevation of a circuit-breaker and its controlling and actuating mechanism constructed in accordance with my invention, the circuits and certain parts of the apparatus being illustrated diagrammatically. Figs. 2 and 3 are views, similar to Fig. 1, of a portion of the apparatus shown in said figure, but illustrating it under different conditions of service. Fig. 4 is a diagram of a system of electrical distribution in connection with which my invention is adapted for use.

In systems of electrical distribution in which energy is supplied to translating devices by a single generator or by a plurality of generators operating in parallel it is desirable to provide means for opening the circuit either immediately upon the occurrence of an excessive flow of current or at the end of a predetermined interval of time during which such excessive flow is maintained, and such means are well known in the art. The circuit-breaking devices heretofore employed not only serve to interrupt the circuits in connection with which they are employed when an excessive current of normal direction is produced by a short circuit or an overload, but they operate in the same manner if an excessive current flows in a reverse direction to the normal. Under certain conditions and in certain relations circuit-breakers of the character indicated are entirely satisfactory. There are other conditions, however, under which a circuit-breaker that will discriminate between an excessive current of normal direction and one that flows in the reverse direction and which will not be operated by the latter is greatly to be desired. We may assume, for example, that a set of alternating-current dynamos are connected to a set of bus-bars from which a number of rotary converters are operated in parallel through appropriate feeder-circuits and that the rotary converters supply direct current in parallel to a single power-circuit. With such an arrangement of apparatus if a short circuit should be established between the power-house circuit breaker or breakers of any feeder-circuit and the rotary converter of that circuit the large amount of stored-up energy in the other rotary converters of the system might cause excessive currents to flow from them to the alternating-current bus-bars before the opening of the circuit-breakers of the short-circuited feeders would be effected. Under such circumstances if the circuit-breakers should be free to open under the action of the reverse currents all of the feeder-circuits might be interrupted because of a short circuit in only one of them. I have accordingly devised the means which will now be described, reference being had first particularly to Figs. 1, 2, and 3 of the drawings.

I have shown my invention as applied to three-phase alternating-current circuits; but it will be understood that the invention is or may be adapted for use in connection with alternating-current circuits of any number of phases which it may be found practicable and desirable to employ and also that it may be employed in connection with direct-current circuits.

Only the conductors 1 and 3 of the three-phase feeder-circuit 1, 2, and 3 are shown as provided with circuit-interrupting devices, this arrangement being satisfactory, though obviously each of the conductors 1, 2, and 3 might be provided with protecting devices, if desired. The primaries 4 and 4ª of series transformers 5 and 5ª are respectively included in conductors 1 and 3, and the primaries 6 and 6ª of shunt-transformers 7 and 7ª have their terminals respectively connected to conductors 1 and 2 and conductors 3 and 2, as shown in Fig. 1 of the drawings.

The apparatus connected to the secondary 8 of the transformer 7 and to the secondary 9 of the transformer 5 will be now described, it being understood that the secondaries 8ª and 9ª of the transformers 7ª and 5ª are connected to apparatus for protecting the side 2 and 3 of the circuit, which is the same in all respects as the apparatus connected to the side 1 and 2 of the circuit.

The terminals of the secondary 8 of the transformer 7 are connected to the terminals of the field-magnet winding 10 of a small motor 11 by means of conductors 12 and 13. The pole-pieces 14 of the motor 11 partially surround an armature 15, the specific construction of which is not illustrated; but it may be understood that it is provided with a winding of ordinary construction which is connected to a commutator-cylinder 16, both being mounted upon a shaft 17. Fastened rigidly to the shaft 17 is one end of a lever 18, the other end of which is provided with a laterally-projecting tooth 19, the purpose of which will hereinafter appear. The motor 11 is provided with two brushes 20 and 21, the brush 20 being connected by means of a conductor 22 to one terminal of the secondary 9 of the transformer 5. The brush 21 is connected to one terminal of the winding 23 of an electromagnet 24, the other terminal of the winding 23 being connected to a stationary contact-terminal 25 and also through a conductor 26 to a brush 27. This brush 27 is arranged to bear upon the periphery of a wheel 28, of non-conducting material, mounted upon a shaft 29 and provided for approximately three-fourths of its circumference with a contact rim or band 30, this band being electrically connected to the shaft 29 by a conductor 31. The wheel 28 is geared to a wheel 32 by means of a clock-train 33, which may be driven by a spring or a weight in the usual manner. The wheel 32 is provided with a lug or tooth 32ª, that projects from its periphery in such position as to engage with the end 34 of a pivoted arm or locking-pawl 35. When the several members are in the positions indicated in Fig. 1, the arrangement and connection of circuits are such that the armature 15 of the motor 11 will tend to rotate in a contra-clockwise direction when the direction of the current in the main circuit is normal. The movement of the armature a considerable distance is, however, prevented by a stop-pin 36, with which the rear side of the arm 18 engages. The armature 37 of the magnet 24 is pivoted at 38 to an upright 39, forming part of a suitable bracket 40.

The armature 37 projects beyond the pivot 38 and is provided at the outer end of the projection with a hooked portion 41, in which rests a pin 42, carried by a vertical rod 43, the upper end of which is pivotally attached to the arm 35. The rod 43 projects through an opening in the extension 44 of the bracket 40, and the projecting end of the rod is surrounded by a coiled spring 45 and provided with an adjusting-nut 46, in order that the pulling-down action of the spring may be regulated, if desired. The armature 37 is provided with an upwardly-projecting circuit making and breaking arm 47, which is moved into engagement with the contact-terminal 25 and an adjacent similar terminal 25ª when the magnet 24 is energized to draw its armature 37 into contact with its upper end. The contact-terminal 25ª is connected by means of a conductor 48 to one terminal of the winding 49 of an electromagnet 50, the other terminal of the winding 49 being connected by means of a conductor 51 to one terminal of the secondary 9 of the transformer 5 and also to the band or strip 30 on the wheel 28 through the shaft 29 and the conductor 31. The circuit-breaker proper, 52, has two stationary contact-terminals 53, that are respectively connected to adjacent terminals of the main conductor 1, and these terminals 53 are bridged by a curved movable contact member 54, this member being connected to a shaft 55 by means of toggle-levers 56, one of these levers having a locking-piece 57, with which a hook on the end of latch 58 engages when the circuit-breaker is closed by means of the handle 59. The weight upon the hook end of the arm 58 is sufficient to normally hold the armature 60, which constitutes an extension of said arm 58, away from its magnet 50.

The operation of the apparatus will now be described. Assuming that the several parts are in the positions indicated in Fig. 1 and that consequently a current of less volume than that for which the apparatus is set to open the circuit-breaker is flowing in a normal direction in the main circuit, if now the current in this main circuit increases beyond the volume for which the apparatus is set the current will flow from the secondary 9 of the transformer 5 through the conductor 22, the commutator and armature of the motor 11, the winding 23 of the electromagnet 24, the conductor 26, brush 27, rim 30, shaft 29, and conductor 51 back to the transformer-secondary 9. The magnet 24 being thus energized will cause its armature 37 to move the member 47 into engagement with the contact-terminals 25 and 25ª and by means of the rod 43 to raise the end of the lever 35 out of engagement with the projection 32ª on the wheel 32. This releases the clock-train, which will continue to run so long as an excessive current continues to flow up to the point where the brush 27 passes from the rim 30 onto the insulated portion of the periphery of the wheel 28, as is indicated in Fig. 2. If the excessive current continues to flow after the circuit is interrupted at the brush 27, it will be compelled to pass from the magnet-coil 23 through contact-terminal 25, contact-arm 47, contact-terminal 25ª, conductor 48, the winding 49 of magnet 50, and conductor 51. The magnet 50 will therefore actuate the armature 60, and thus effect the release of the circuit-breaker in order that it may open. The clock-train will continue to revolve until the projection 32ª comes into engagement with the end of arm 35, when the parts will be set for operation, the same as is indicated in Fig. 1, except for the fact that the circuit-breaker would not, under these circumstances, be closed. The positions of the several parts of the apparatus when the circuit-breaker is open are indicated in Fig. 2, except that, as there shown, the magnet 24 has not released its armature. Assuming now that the parts are in the positions indicated in Fig. 1 and that a flow of current that exceeds that for which the apparatus is set takes place in the reverse direction to the normal, the armature of the motor 11 will be rotated a sufficient distance in a clockwise direction to bring the projection 19 on the end of the arm 18 into engagement with the periphery of the wheel 32. The magnet 24 will be energized and the parts will be brought into the several positions which they would occupy if the excessive current was in a normal direction, except as regards the armature of the motor 11 and the locking-arm projecting therefrom. The clock-train will therefore continue to rotate the wheel 28, provided the excessive current continues to flow, until the stop projection 32ª comes into engagement with the projecting end 19 of the arm 18, as indicated in Fig. 3. The rotation of the wheel 28 is thus stopped before the brush 27 passes from the conducting-band 30, and since the contact-terminals 25 and 25ª are bridged by the member 47 the magnet 50 remains short-circuited and the circuit-breaker does not open. When the current again resumes its normal direction, the motor 11 will move the arm 18 in a contra-clockwise direction, and thus release the clock-train, which will move the wheels 28 and 32 into the position shown in Fig. 1, thus resetting the apparatus for further use.

Referring now to Fig. 4, in connection with the other figures of the drawings, A and B are three-phase generators supplying energy to bus-bars *a*, *b*, and *c*. Leading from these bus-bars are a plurality of three-phase feeder-circuits, three of such circuits being shown in the drawings. It will be understood, however, that any other desired number of such circuits may be employed, if desired. Inasmuch as these sets of conductors are or may be alike, I have employed the numerals 1, 2, and 3 to designate the several conductors of each set. I have indicated the conductors 1 and 3 as provided adjacent to the buss-bars with circuit-interrupting devices C, these devices being shown diagrammatically and in conventional form, but being intended to embody in practice the essential features of the apparatus already described. The conductors 1, 2, and 3 extend to and provide energy for operating a rotary converter D, which supplies direct-current energy to conductors *e* and *f*, which may be a railway or other power circuit. One of the direct-current conductors *d* and *d'*, leading from the rotary converter D to the conductors *e* and *f*, is provided with a circuit-breaking device E. It will be understood that this diagram which we have just been considering shows only the essential elements of a distributing system, the controlling, measuring, and other apparatus being omitted for the sake of simplicity. Circuit-breakers C are of the automatic type that we have been considering and are intended to open the circuits in which they are placed when the currents in such circuits exceed a predetermined amount and are maintained a certain predetermined length of time, provided such currents are delivered to the rotary converters from the bus-bars. If, however, a short circuits occurs in any one of the feeder-circuits anywhere between its circuit-breakers C and its rotary converter D, the rotary converters of the other feeder-circuits, which may be of large size and possess a large amount of stored-up energy in their rotating elements, may act as generators of alternating currents and deliver such currents for a short time to the bus-bars at the power-house. If these currents should exceed in amount that for which the circuit-breakers have been set, the latter would be actuated to open the circuits, and thereby cause much inconvenience and a possible shutdown of the entire system under the usual conditions of operation. With my construction and arrangement of apparatus, however, no backward flow of energy through any of the feeder-circuits by reason of a short circuit in any other feeder-circuit or from any other cause can trip its circuit breaker or breakers, and thus withdraw it or them from service.

I desire it to be understood that my invention is not limited to any particular type of circuit-breaker or in other respects to the specific details of apparatus shown and described.

I claim as my invention—

1. In a system of electrical distribution comprising a plurality of feeding or distributing circuits supplied from one set of bus-bars, a circuit-breaker for each circuit having means actuated by excessive current of normal direction to effect its release and having means for preventing its release when subjected to reverse current.

2. A circuit-breaker for electrical circuits having means for locking it in circuit-closing position, means for opening it when released, releasing means actuated by an excessive current of normal direction and means for preventing release when the current is reversed.

3. In a system of electrical distribution comprising a plurality of feeding or distributing circuits supplied from one set of busbars, a circuit-breaker for each circuit having locking and releasing devices and provided with an actuating means for the releasing device which is rendered active by an excessive current of normal direction, and which is not affected by a reverse current.

4. A circuit-breaker provided with means for actuating it at the end of a predetermined interval of time during which an excessive current of normal direction is maintained and with means for locking it against operation when a reverse current flows in its circuit.

5. In a system of electrical distribution comprising a plurality of feeding or distributing circuits supplied in parallel from a source of energy, a circuit-breaker for each circuit provided with means for normally holding it in circuit-closing position, in combination with a releasing device, means operated by excessive current of normal direction for actuating said releasing device and dependent upon the maintenance of such current during a predetermined interval of time and means for locking said actuating means when a reverse current flows through the circuit containing the breaker.

6. In a system of electrical distribution comprising a plurality of circuits supplied in parallel from a source of energy, a normally closed circuit-breaker for each circuit provided with releasing means operated by an excessive current of normal direction, in combination with time mechanism and connections for retarding the action of said releasing means a predetermined length of time after the beginning of a maintained flow of excessive current and a controlling device for said time mechanism which prevents release of the circuit-breaker when a reverse current flows in the circuit.

7. In a system of electrical distribution comprising a plurality of circuits supplied in parallel from a source of energy and supplying a power-circuit through rotary converters, a normally closed circuit-breaker for each circuit provided with releasing means operated by an excessive current of normal direction, in combination with time mechanism and connections for retarding the action of said releasing means a predetermined length of time after the beginning of a maintained flow of excessive current and a controlling device for said time mechanism which prevents release of the circuit-breaker when a reverse current flows in the circuit.

8. In a system of electrical distribution, the combination with a source of polyphase alternating-current energy and a plurality of circuits connected in parallel to said source, of rotary converters severally receiving energy from said circuits and supplying direct-current energy in parallel to a power-circuit, circuit-breakers for said parallel circuits provided with opening means which is rendered operative by an excessive current of normal direction and with means for rendering said opening means inactive when a reverse current flows.

In testimony whereof I have hereunto subscribed my name this 7th day of June, 1900.

LEWIS B. STILLWELL.

Witnesses:
FRANCIS U. WILCOX,
E. F. SCHUYLER.